(12) United States Patent
Thorpe et al.

(10) Patent No.: US 9,997,201 B2
(45) Date of Patent: Jun. 12, 2018

(54) METHOD AND APPARATUS FOR VIDEO COMPRESSION OF MULTIPLE INSTANCES USING INDEX FRAMES

(71) Applicant: PHILO, INC., Cambridge, MA (US)

(72) Inventors: Christopher Thorpe, Lincoln, MA (US); Thomer Gil, Brookline, MA (US); Christopher Small, Cambridge, MA (US)

(73) Assignee: PHILO, INC., Cambridge, MA (US)

( * ) Notice: Subject to any disclaimer, the term of this patent is extended or adjusted under 35 U.S.C. 154(b) by 0 days. days.

(21) Appl. No.: 14/745,274

(22) Filed: Jun. 19, 2015

(65) Prior Publication Data

US 2015/0373300 A1    Dec. 24, 2015

Related U.S. Application Data

(60) Provisional application No. 62/015,367, filed on Jun. 20, 2014.

(51) Int. Cl.
| | |
|---|---|
| *G11B 27/10* | (2006.01) |
| *G11B 20/00* | (2006.01) |
| *H04N 9/804* | (2006.01) |
| *H04N 9/82* | (2006.01) |

(52) U.S. Cl.
CPC ........ *G11B 27/102* (2013.01); *G11B 20/0021* (2013.01); *G11B 20/00086* (2013.01); *G11B 20/00884* (2013.01); *H04N 9/8042* (2013.01); *H04N 9/8205* (2013.01)

(58) Field of Classification Search
CPC ............ G11B 27/102; G11B 20/00086; G11B 20/0021; G11B 20/00884; H04N 9/8042; H04N 9/8205

See application file for complete search history.

(56) References Cited

U.S. PATENT DOCUMENTS

| | | | | |
|---|---|---|---|---|
| 2002/0036640 | A1* | 3/2002 | Akiyoshi | H04N 7/17336 345/475 |
| 2002/0095582 | A1* | 7/2002 | Peled | G06F 21/10 713/180 |

(Continued)

OTHER PUBLICATIONS

International Search Report and Written Opinion dated Sep. 21, 2015, regarding PCT/US2015/036829.

*Primary Examiner* — Hung Dang
*Assistant Examiner* — Sunghyoun Park
(74) *Attorney, Agent, or Firm* — Nicholson De Vos Webster & Elliott LLP

(57) ABSTRACT

The system provides a method and apparatus for writing a unique copy of data associated with each of a plurality of individual users, without the need for storing duplicate copies of the entire data file. The system provides for creating an unusable copy of a portion of the data that is to be shared by all users of the complete data. The system will store and optionally encrypt and/or watermark a unique copy of the remainder portion of the data for each unique user. When accessed from storage, the system will combine the shared portion with the unique remainder to reconstitute the entire file for access by the user. Deleting the unique remainder associated with a particular user makes all of the data useless to that user. In one embodiment, the system first compresses the entire data file using index frames and delta.

7 Claims, 7 Drawing Sheets

(56) References Cited

U.S. PATENT DOCUMENTS

| | | | |
|---|---|---|---|
| 2002/0138843 A1* | 9/2002 | Samaan | H04N 7/17318 |
| | | | 725/87 |
| 2003/0198305 A1* | 10/2003 | Taylor | H04B 1/7105 |
| | | | 375/341 |
| 2005/0094808 A1 | 5/2005 | Pedlow et al. | |
| 2006/0133644 A1* | 6/2006 | Wells | G06Q 20/3829 |
| | | | 382/100 |
| 2007/0297448 A1* | 12/2007 | Heikens | H04N 7/173 |
| | | | 370/468 |
| 2008/0063362 A1 | 3/2008 | Grigorian | |
| 2009/0006955 A1* | 1/2009 | Wang | G06F 3/048 |
| | | | 715/702 |
| 2009/0178096 A1 | 7/2009 | Menn et al. | |
| 2009/0225983 A1 | 9/2009 | Reinoso et al. | |
| 2010/0325656 A1* | 12/2010 | Hardacker | H04N 21/251 |
| | | | 725/31 |
| 2011/0296453 A1* | 12/2011 | Srinivasan | H04H 60/33 |
| | | | 725/13 |
| 2012/0210382 A1* | 8/2012 | Walker | G06F 17/30017 |
| | | | 725/115 |
| 2013/0091243 A1* | 4/2013 | Harnevo | G06Q 30/00 |
| | | | 709/217 |

* cited by examiner

METHOD AND APPARATUS FOR VIDEO COMPRESSION OF MULTIPLE INSTANCES USING INDEX FRAMES

This patent application claims priority to U.S. Provisional Patent Application No. 62/015,367 filed on Jun. 20, 2014 which is incorporated by reference herein in its entirety.

BACKGROUND OF THE SYSTEM

There are circumstances where it is desirable to store duplicate copies of data to temporary and/or permanent storage. In one instance, it may be necessary to store multiple copies of a single video file, one for each of a plurality of users, purchasers, renters, or consumers of the video file. This may be due to legal requirements, such as copyright requirements. The cost of storage space needed to store a separate copy for each user without compression may be prohibitive. In addition, scalability may be limited due to the unpredictability of how many users may want to access the same video file.

SUMMARY

The system provides a method and apparatus for writing unique copies of data associated with each of a plurality of individual users, without the need for storing duplicate copies of the entire data file. The system provides for creating an unusable copy of a portion of the data that is to be shared by all users of the complete data. The system will store a unique copy of the remainder portion of the data for each unique user. When accessed from storage, the system will combine the shared portion with the unique remainder to reconstitute the entire file for access by the user. In one embodiment, the system first compresses the entire data file using index frames (e.g. "I" frames also known as "Key" frames) and delta frames (e.g. transitional P and/or B frames). A unique copy optionally encrypted and/or watermarked of the index frames is stored for each of the plurality of users. Deleting the unique copy associated with a particular user makes all of the data useless to that user. A single copy of the delta frames is stored regardless of the number of users. This reduces the storage requirements significantly while storing a unique file for each of the plurality of users.

DETAILED DESCRIPTION OF THE SYSTEM

Figure 1:
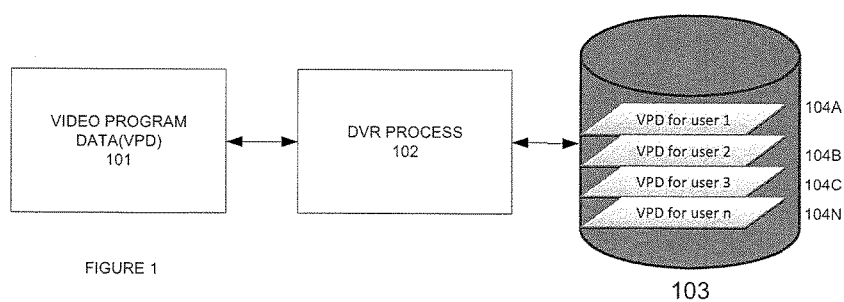
FIG. 1 is a block diagram of a video content storage system.

The system provides a method and apparatus for efficiently storing and/or streaming video data where the data is split into two parts. One part of the data is stored in common for all users of the data. In one embodiment the common data is referred to as "dependent" data. The dependent data is unusable separately from the remaining portion, the independent data. In the system, the independent data is stored as a unique copy for each user. When a particular user desires to access the data, that user's independent data is combined with the common dependent data to generate the full data file. By separating the data in this manner, overall storage requirements are greatly reduced.

The capacity of data storage devices has continued to grow as the cost per byte of storage has continued to decline. Nevertheless, storage space is not infinite and there exists a need to optimize the storage of data both to reduce the storage space required as well as the ability to improve data transfer rates from storage to a desired location. Often this is accomplished by applying data compression to data files to reduce their size. There are some circumstances when it might be required to store multiple copies of the same data. In those cases, even with data compression applied on a per-file basis, the data storage requirements are a linear function of the number of copies that must be stored. That is, ten copies require ten times the storage of a single copy, even with data compression applied.

One circumstance where multiple copies of the same data must be stored is where multiple users own or have rights to a copy of a copyrighted multimedia file, such as an audio file and/or video file. A copyright holder might require that each owner, renter, or user of a media file have a separate copy of that file, particularly where the file is accessed in a digital and/or streaming environment. In cases where a media file is embodied in a physical medium, such as a DVD, each user must obtain their own copy of the DVD to have access to the content. In a rental situation, only one user can rent the DVD at one time, so there is no risk of multiple users accessing the content at the same time.

The situation is different in the context of cloud based storage, server based storage, and streaming environments. Many users have a digital video recorder (DVR) in their homes and use it to record content that is broadcast and/or delivered by satellite or cable and the like. Where each user has its own DVR there will be a separate copy of content on the DVR of each user who records the content. However, there exists an environment where it is desired to provide cloud based or central server based DVR functionality to end users, where recorded content is stored in the cloud or at some other server based location and not on a user's local DVR. In that environment, when a plurality of users chooses to record the same content, the cloud server typically stores the same number of copies. This rapidly increases the storage requirements of the cloud server, even though it is storing essentially identical copies of the same data.

FIG. 1 illustrates an example system where duplicate files may need to be written to storage, such as video program files. In this example, video program files are to be written to storage and associated with multiple users. In one example, a single video program may be recorded by multiple users. The program is stored as video program data 101 at a remote server and/or in cloud based storage. For each user that wants to record the program, a separate copy must be made and associated with each user. The system contemplates a DVR (Digital Video Recorder) process 102 that is accessed by multiple users to request the recording of a video program. This may be a film, a live broadcast program, video on demand, or any other source of program data and content. In response to user requests, the DVR process writes a copy of the video program data to DVR storage 103. As noted above, the DVR process and the DVR storage may be a provided as a shared service for multiple distinct users.

For each user that requests a program, a separate copy is written to and stored in storage 103. As shown in FIG. 1, these files comprise an individual instance for each user who requests recording of a program. The copy stored for each user are identified as such as VPD 104A to VPD 104N where VPD represents Video Program Data.

If the video program has a size of M, the storage requirements of storage 103 to store N copies of the video program are N×M. This storage requirement can be significant for video data, particularly high definition video data.

Figure 2:
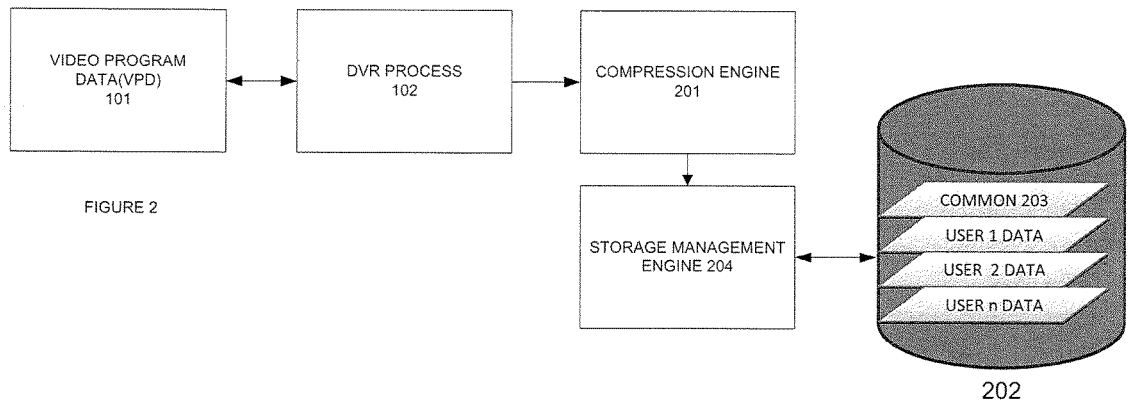
FIG. 2 is a block diagram of a video content storage system illustrating an embodiment of the system.

FIG. 2 illustrates a system for reducing the storage requirements for storing N copies of a video program. After the program is recorded in the DVR process 102 it is provided to a compression engine 201 where it is divided into a dependent (common) portion and an independent portion. In an embodiment of the system neither portion can be used separately from the other. A user having only one of the portions is unable to view the underlying content.

The compressed data is then provided to storage management engine 204. The storage management engine 204 is used to identify the authorized users with whom a copy of the independent data is to be associated. The storage management engine then causes a separate copy of the independent portion of the data to be stored in storage 202.

For storage, the compression engine stores a single instance 203 of the dependent portion in storage 202. The dependent portion 203 may comprise up to 80% of the total data of the video program. For each user, a unique copy of the independent data is stored in separate files (e.g. User 1 Data, User 2 Data, User N Data). Although in some instances, the video data that comprises the independent data may be identical for each user, nevertheless an individual copy is stored for each user. The independent data may optionally be uniquely encrypted by the Storage Management Engine 204 for each user so that it cannot be shared by any other user. The independent data may optionally be uniquely watermarked by Storage Management Engine 204 so that it uniquely identifies its authorized user when combined with the dependent data. In some cases the independent data may comprise, for example, approximately 20% of the total data in the video program. By storing a single copy of the dependent data and multiple copies of only the independent data, the storage needs are significantly reduced.

In operation, the system may take advantage of existing image compression schemes to create the dependent data and the independent data. In one embodiment, the video data is encoded as a sequence of Index-frames ("I" frames or Key frames) followed by a series of Delta frames (P and/or B-frames). An I-frame is an 'Intra-coded picture', in effect a fully specified image frame, like a conventional static image file. P-frames, on the other hand, hold only part of the image information, so they need less space to store than an I-frame and thus improve video compression rates. P-frames refer back to earlier I-frames. A P-frame typically does not include image information that is common with the preceding I-frame or preceding P-frame. By not duplicating common image information, improved compression can be achieved. For example, the P-frame that follows an I-frame may describe how to modify the image from the I-frame to create the next image in the video. Multiple P-frames may sequentially build on each other, each one describing how the result of the previous transformation needs to be transformed to generate the next image in the video. H.264 is an example of such a coding technique. A B-frame is a delta frame that can refer to previous and following I-frames. An aspect of this coding technique and any coding technique used with the present system is that an image cannot be reproduced without appropriate data being available from an I (index) frame.

Typically a new I-frame is required whenever there is a scene change or when there is sufficient change in the image information in frame that is makes more sense to start with a new I-frame. After this type of coding, the video data is represented as a series of I and P frames as follows:

```
IPPPPPPPPPPIPPPPPPPPPPIPPPPPPPPPPIPPPPPPPPPPIPPPPP
PPPPPIPPPPPPPPPPP
```

(Note that the number of P-frames is not necessarily the same between each I-frame).

After the coding operation, the compression engine removes the I-frames from the coded data sequence as follows:

```
I            I            I            I
  PPPPPPPPPP PPPPPPPPPP PPPPPPPPPP PPPPPPPPPP
I          I
  PPPPPPPPPP PPPPPPPPPP
```

Storage 202 stores only a single copy of the P-frames. It should be noted that the P-frames are unsuitable for playback, because they lack the image information that is provided by the I-frame of each sequence.

The compression engine optionally encrypts, optionally inserts a copy-specific watermark, transfers, and stores N copies of the I-frame stream, one for each of N users that are associated with the content. Each copy may be encrypted with a key that is unique to a particular user.

To retrieve the data, the system decrypts (where appropriate) the user's I-frame data stream, combines it with the dependent P-frame data, and transmits or streams the restored video program data.

Figure 3:
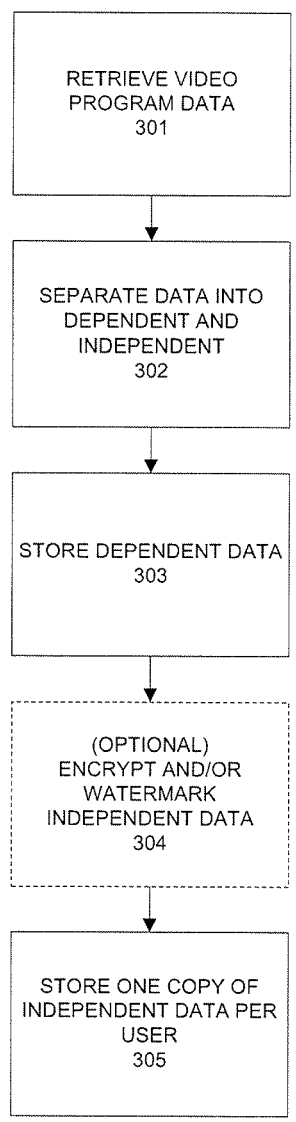
FIG. 3 is a flow diagram illustrating the operation of an embodiment of the system.

FIG. 3 is a flow diagram illustrating the operation of the system in creating a data file for a user. At step 301 the system retrieves video program data. This represents data that an authorized user has requested for storage or recording. At step 302 the system separates the data into dependent data and independent data. As noted above, this may be accomplished by applying a compression scheme that utilizes a coding scheme that relies on key frames and progressive frame building from prior frames to generate a full sequence of the content. Although H.264 is one example of such a scheme, any other scheme may be used without departing from the scope and spirit of the present system, including, but not limited to, H.262, H.265, and VP8.

At step 303 the system stores one copy of the dependent data in storage. At optional step 304 the Storage Management Engine 204 of the system optionally encrypts a copy of the independent data for each user of the data. If the independent data is not encrypted for each user, then the Storage Management Engine 204 still associates one copy of the independent data for each authorized user associated with storage of the program. At step 305 the system stores one copy of the encrypted independent data for each user.

Figure 4:
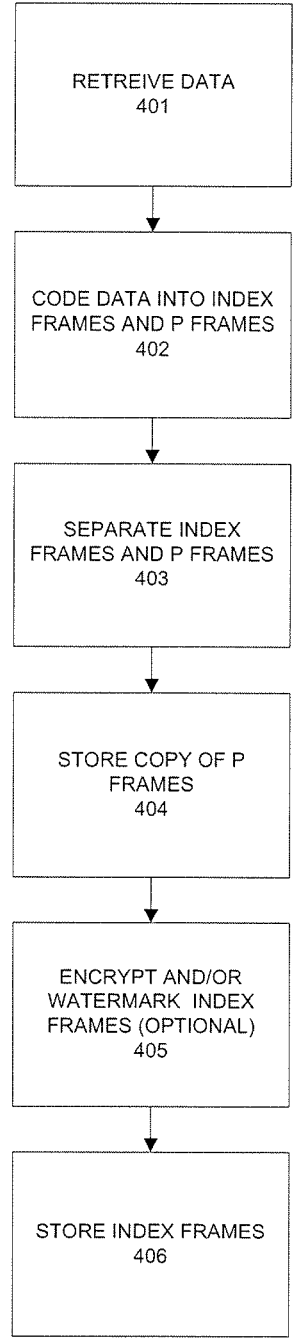
FIG. 4 is a flow diagram illustrating an aspect of the operation of an embodiment of the system.

FIG. 4 is a flow diagram showing the operation of the system using the I-frame and P-frame technique described above. At step 401 the system retrieves the video program data. At step 402 the system codes the video program data into a stream of Index frames and P frames as described above. At step 403 the system separates the P frames from the Index frames. At step 404 the system stores one single copy of the P frames, optionally encrypted optionally with a unique watermark. At step 405 the system creates a version (optionally encrypted) of the Index frames for each user of the data. At step 406 the system stores one copy of Index frame data for each user of the data.

In another embodiment, the system implements the compression of a video file by separating the original file into a set of index files and a program that can be used to recreate the original file. Consider a video file Vorig that is to be stored by the system. The system produces (a) Vindex, a file containing the index frames of Vorig, and (b) a program, Vprog. The program, Vprog, encapsulates the P frames of Vorig and the code required to combine the P frames of Vorig with a file of index frames. When Vprog is executed with Vindex as input it produces Vorig as output. When Vprog is executed with any other file as input the output will not match Vorig. Also note that Vprog by itself is not a viewable video.

Figure 5:
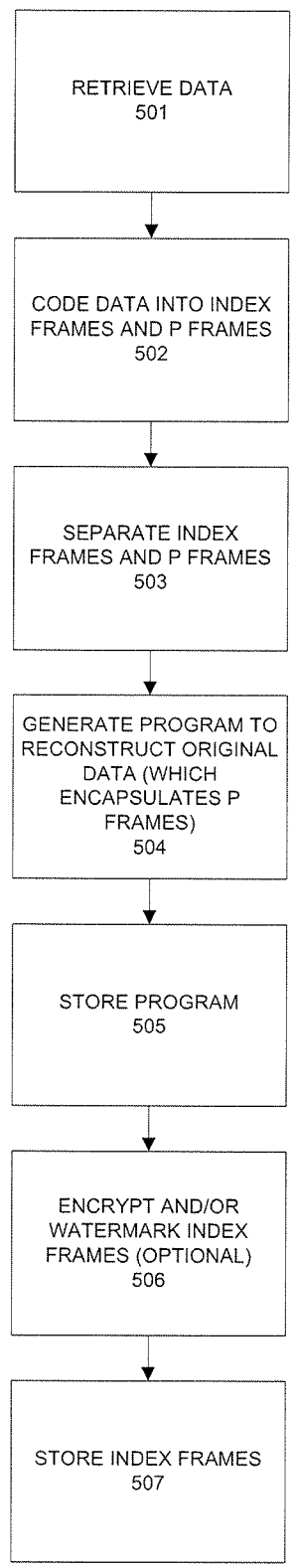
FIG. 5 is a flow diagram illustrating an alternate embodiment of the system.

This embodiment is illustrated in the flow diagram of FIG. 5. At step 501 the system retrieves the video data file to be compressed. At step 502 the system codes the data into index frames and P frames. At step 503 the system separates the index frames and the P frames.

At step 504 the system generates a program to reconstruct the original data that encapsulates the P frames and code to combine its input with the P frames. (The input will be the index frames). In one embodiment the program implements the transformations that are described by the P frames. To reconstruct the original (decompressed) video the generated program reads each index frame, performs the transformations on that index frame that were encapsulated in the corresponding P frames, generating the uncompressed video, and then goes on to the next index frame.

At step 505 the system stores a single copy of the program generated in step 504. At step 506 the system may optionally encrypt the index frames and may optionally add a unique watermark. This may comprise a uniquely encrypted copy for each individual user or it may be multiple copies of a single encrypted copy. At step 507 the system stores the appropriate number of index frame files.

To reconstruct the original file, the system provides a copy of the index frames to the stored program. The program uses the index frames as input and combines them with the P frame data that is already part of the program to generate the original file for playback.

The system can also be used to reduce the cost of streaming data for playback, particularly for secured data. Because the Delta frame data is unusable without the Index frame data, it may be possible for it to be transmitted to a user over a non-secure channel. The relatively smaller amount of encrypted Index frame data can be transmitted on a secure channel. The streams are combined at the user's location. In another embodiment, a user or exhibitor can be provided the dependent data for local storage. Whenever the user or exhibitor wishes to view the program, only the independent data is transmitted in a secure manner for combination with the dependent data for viewing. In this manner, a complete copy of the content is never available to the user, only when viewing is desired are all parts available. The dependent data can be transmitted on a cheaper unsecure channel, could be provided in advance on physical media (or transmitted in advance) and is used only when the secure independent data has been provided.

Synchronizing Broadcasts

The system may be used to record the same broadcast program in different markets. In that case, the commercials that may be part of a broadcast will be different in different markets. In such an environment, the compression of the data will result in different I frames and P frames. Each different interstitial (e.g. commercial, promo, station identification and the like) will result in a new I frame. In such a case, the dependent data cannot be used for all users in all markets unless the system accounts for the variations in the interstitials. In one embodiment, the system separates the program content from all interstitials and compresses the program as described in connection with FIGS. 3-5 above, and creates separate files for the interstitials. In another embodiment, the system may compress the program content and interstitials from each individual market in a separate process.

In addition to asymmetric interstitials, a user may initiate or end a recording at a different time than other users. For example, a user may initiate the recording of a program after the program has begun or end recording before the program has ended. In other cases the user may have added extra time for the recording to make sure that no content is missed, particularly in connection with a live event, such as a sporting event. The system provides a method for identifying different start times and end times and compensating appropriately to enable storage advantages.

Figure 6:
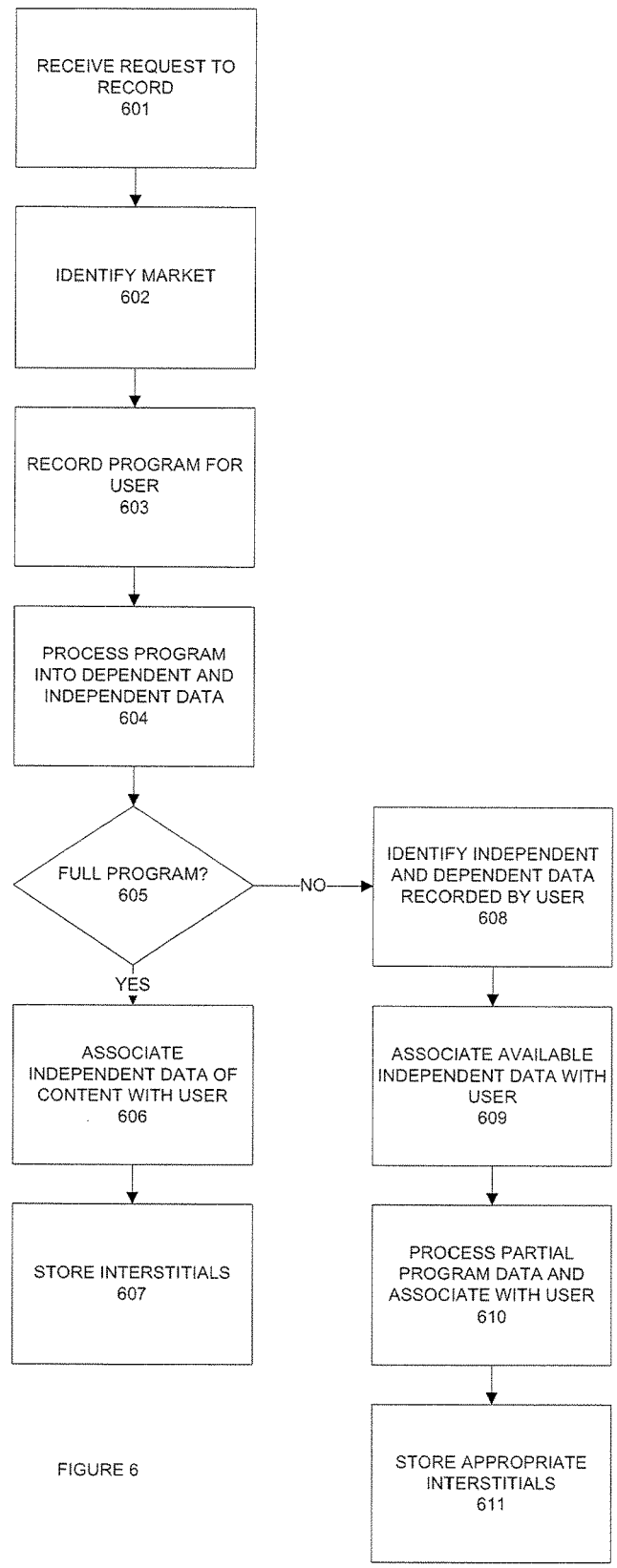
FIG. 6 is a flow diagram illustrating the operation of the system in a market.

FIG. 6 is a flow diagram of the operation of the system in synchronizing recording that may contain different interstitials and/or different start times. At step 601 the system receives a request to record a program. At step 602 the system identifies the market associated with the user making the request. In this embodiment a "market" is defined as a region that will have the same commercials and other interstitials associated with the program. For example, the market may be identified by an affiliate that is broadcasting the program (e.g. KCBS 2 in Los Angeles, KDKA in Pittsburgh, and the like).

At step 603 the system records the program based on the start time and end time of the user. At step 604, after the end of the broadcast of the program, the system processes the program content to generate dependent and independent data as described above. If the program is a broadcast of a pre-recorded program, the system may have already processed the program content into dependent and independent portions. If the broadcast is a live broadcast, the system can process the program as it is broadcast and/or after the broadcast is complete. When the system processes the program data, it includes links to all interstitial data associated with the market of broadcast identified in step 602.

At decision block 604 it is determined if the user recorded the full program. This can be based on time codes associated with the broadcast of the program as compared to the start time and end time of the user. If the user has recorded the full program, the system proceeds to step 605 and associates the independent portion of the data with the user and stores a unique copy of the independent data in storage and associates it with the user. The independent data can reference and use the single copy of the dependent data for use in data reconstruction.

At step 607 the system then stores a copy the interstitial data associated with the market. The interstitial data is linked to the program in the appropriate locations so that it is broadcast during reply of the recorded program. In one embodiment, the interstitial data itself may be compressed for easier storage in the manner described in association with the program data. In one embodiment, the entire broadcast with interstitials may be processed as a single file.

If the user has not recorded the entire program at decision block 605, the system proceeds to step 608. At step 608 the system determines which program data has been recorded by the user. This may be accomplished by comparing time codes of the user's request for recording start and end times with the program data. The system then identifies the independent data and dependent data that has been recorded by the user. At step 609 the system associates the available independent data with the user and stores a unique copy of the appropriate independent data and links it to the user.

At step 610 the system processes the partial program data and associates it with the user. In this case, the user will have at least one segment of partial program data at the beginning and/or end of the program data recorded by the user that requires its own processing, with its own independent data and dependent data. In one embodiment, the system may not process the partial program data at all, but store it in full.

At step 611 the system stores the appropriate interstitials that are present in the portion of program data that was recorded by the user and creates an association with the user.

Figure 7:
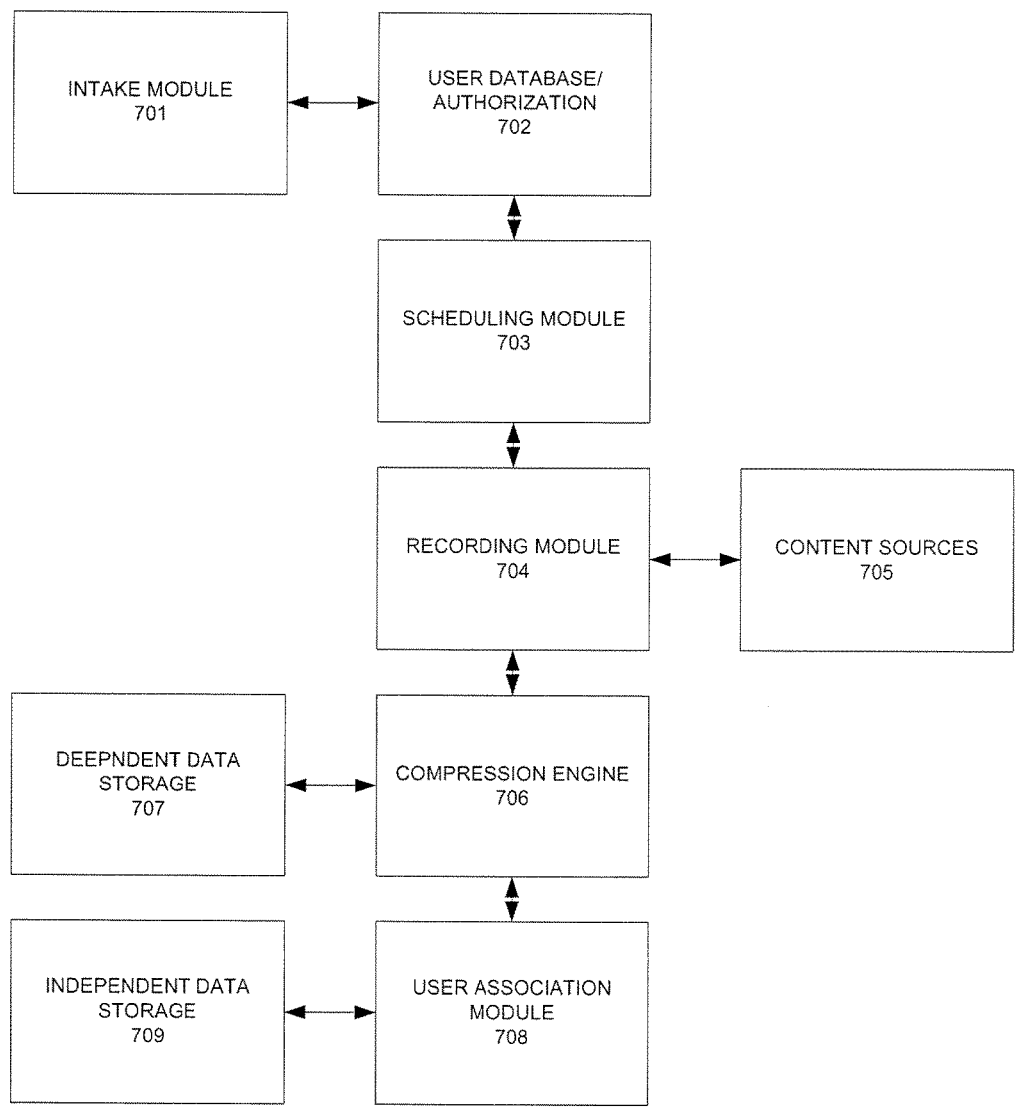
FIG. 7 illustrates an embodiment of apparatus of the system.

FIG. 7 illustrates an example embodiment of the system. An Intake Module 701 is used to receive recording requests from one or more users. The request typically includes the name of the program to be recorded, user selected start times and end times, user information, and channel and/or provider information. This request can be received via a two way link such as via a set-top box and the like, or via wireless communication from the user. The request may be sent via an entertainment system or via a processing device such as a computer, smart-phone, and the like.

The Intake Module 701 is coupled to a User database and authorization module 702 that is used to determine if the user is an authorized user of the system. If so, the recording request is provided to the scheduling module 703. At the appropriate time, the Recording Module 704 is used to record the scheduled program from content sources 705. The content sources 705 may be one or more of any content delivery sources, including broadcast, online delivery, video on demand, cable, satellite, and the like.

After recording, the compression engine 706 is used to create the compressed recording as described above. After compression, the dependent data is stored in dependent data storage 707. The independent data is provided to User Association module 708 where a unique instance of the independent data is associated with each user that requested the recording, optionally encrypted, and stored in independent data module 709. In one embodiment dependent data storage 707 and independent data storage 709 can reside in the same physical memory. In another embodiment, the storage can be any suitable cloud based or server based storage system.

Content Playback

Figure 8:
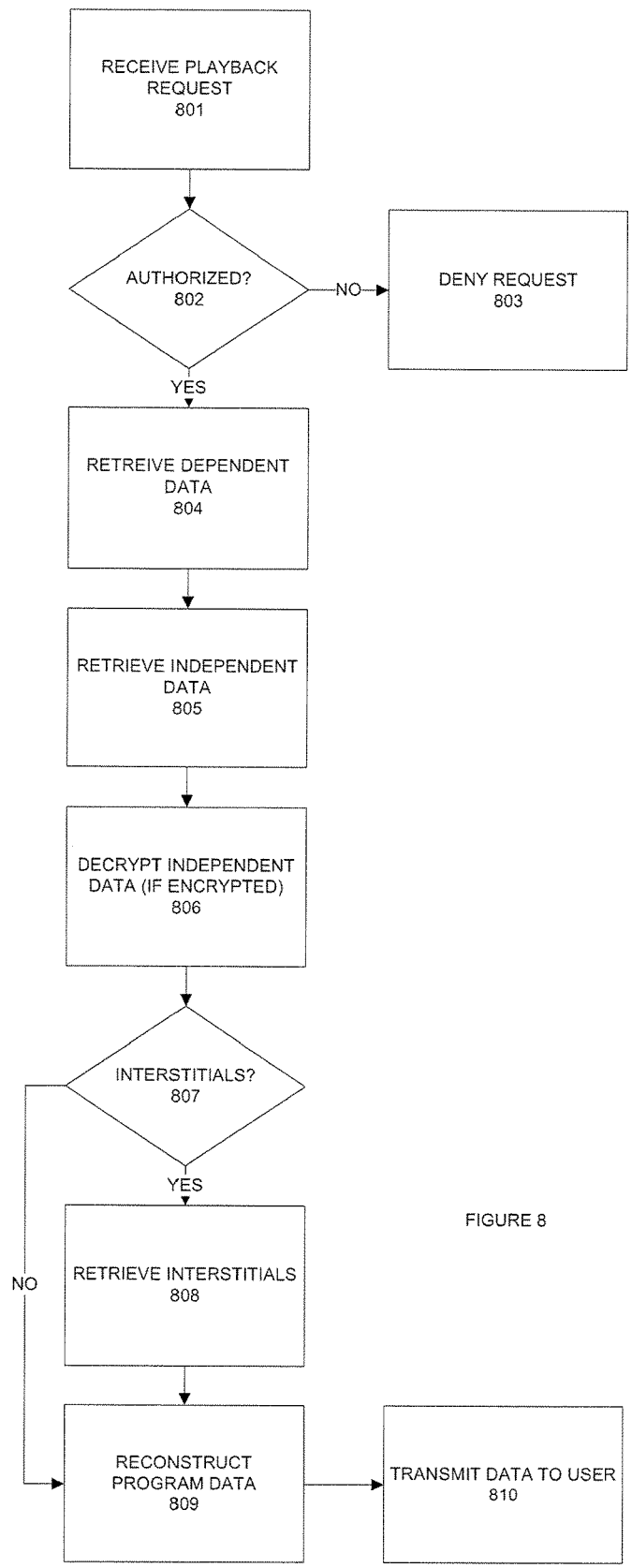
FIG. 8 is a flow diagram illustrating the decoding of stored content using the system.

FIG. 8 is a flow diagram illustrating content playback in one embodiment of the system. At step 801 a user requests playback of a recorded program. Such a request may be communicated to the system via a wired or wireless communication. At decision block 802 it is determined if the user is an authorized user and if the user had previously requested that the program be recorded. If not, the system denies the request at step 803.

If the user is an authorized user, the system proceeds to step 804 and retrieves the dependent data for the recorded program. At step 805 the system retrieves the unique copy of the independent data associated with the requesting user. At step 806 the system may decrypt the independent data as needed. In one embodiment, the independent data may be optionally marked with a watermark during this playback process.

At decision block 807 it is determined if there are interstitials associated with the recorded program that should be combined with the program data. If so, the system retrieves the appropriate interstitials at step 808. This may involve retrieving stored interstitials associated with the particular instance of the recorded program based on the metadata associated with the original recording request.

After the interstitial data is retrieved, or if there is no interstitial data at step 807, the system reconstructs the program data at step 809 by using the independent data and combining it with the dependent data, inserting interstitials where appropriate. At step 810, the system transmits the reconstructed program to the user at step 810.

Processing System Embodiment

Figure 9:
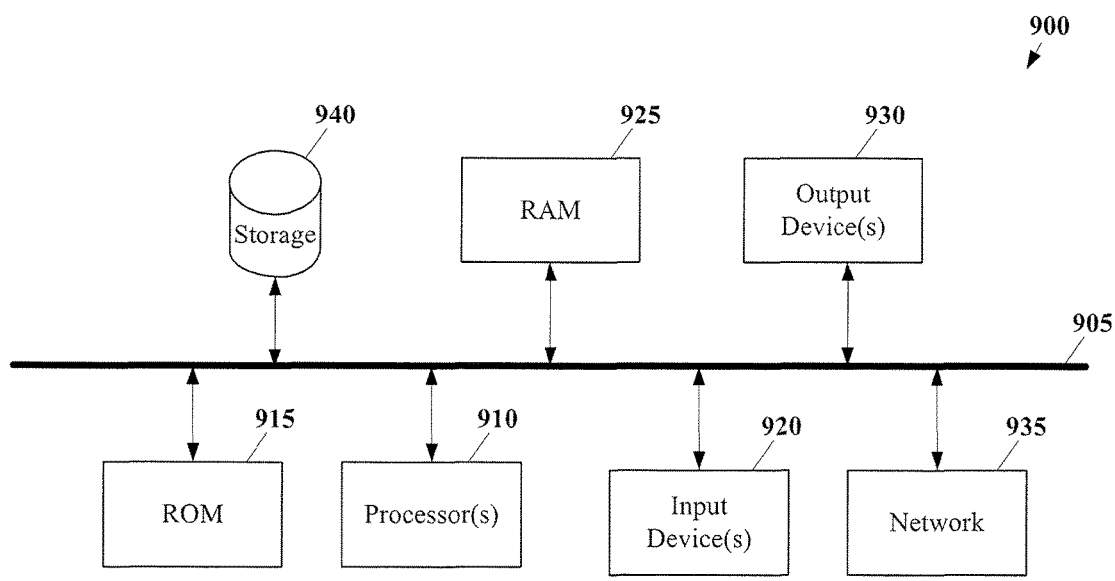
FIG. 9 illustrates an example computer embodiment of the system.

FIG. 9 illustrates an exemplary computer system 900 that may implement the system. The computer system includes various types of computer readable media and interfaces. The system includes a bus 905, processors 910, read only memory (ROM) 915, input device(s) 920, random access memory 925), output device(s) 930, a network component 935, and a permanent storage device 940.

The bus 905 the communicatively connects the internal devices and/or components of the computer system. For instance, the bus 905 communicatively connects the processor(s) 910 with the ROM 915, the RAM 925, and the permanent storage 940. The processor(s) 910 retrieve instructions from the memory units to execute processes of the invention.

The ROM 915 stores static instructions needed by the processor(s) 910 and other components of the computer system. The ROM may store the instructions necessary for the processor to execute the web server, web application, or other web services. The permanent storage 940 is a non-volatile memory that stores instructions and data when the computer system 900 is on or off. The permanent storage 940 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The RAM 125 is a volatile read/write memory. The RAM 925 stores instructions needed by the processor(s) 910 at runtime. The bus 905 also connects input and output devices 920 and 930. The input devices enable the user to communicate information and select commands to the computer system. The input devices 920 may be a keyboard or a pointing device such as a mouse. The input devices 920 may also be a touch screen display capable of receiving touch interactions. The output device(s) 930 display images generated by the computer system. The output devices may include printers or display devices such as monitors.

The bus 905 also couples the computer system to a network 935. The computer system may be part of a local area network (LAN), a wide area network (WAN), the Internet, or an Intranet by using a network interface. The web service may be provided to the user through a web client, which receives information transmitted on the network 935 by the computer system 100.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for" or, in the case of a method claim, the element is recited using the phrase "step for."

Thus, a method and apparatus for video compression of multiple instances of video content is described.

What is claimed is:

1. A method, by a cloud server operating as a digital video recorder for each a plurality of users, of storing multiple copies of video program content in storage without having to store multiple complete copies, the method comprising:
    receiving, by the cloud server, a video program content for which each of the plurality of users has made a request that the video program content be recorded so that that user may request to receive the video program content at a later time;
    separating the video program content into dependent and independent portions;
    storing a single copy of the dependent portion for all of the plurality of users; and
    storing, for each user of the plurality of users that requested the video program content be recorded, a different copy of the independent portion prior to a request by that user to receive the video program content.

2. The method of claim 1 wherein the independent portion comprises Index Frames.

3. The method of claim 2 wherein the dependent portion comprises Delta Frames.

4. The method of claim 1 wherein the independent portion cannot be viewed without the dependent portion and the dependent portion cannot be viewed without the independent portion.

5. The method of claim 1 wherein the independent portion is encrypted separately for each user.

6. The method of claim 1 wherein the independent portion comprises a program code to reconstitute the video program content using the dependent portion.

7. The method of claim 1 wherein the separating of the video program content comprises applying H.264.

* * * * *